Dec. 6, 1966 — C. C. DE PEW — 3,289,876
INSULATED FILLER CAP
Filed Feb. 9, 1965 — 2 Sheets-Sheet 1

INVENTOR.
CHESTER C. DE PEW
BY JOHN P. CHANDLER
HIS ATTORNEY.

Dec. 6, 1966  C. C. DE PEW  3,289,876
INSULATED FILLER CAP
Filed Feb. 9, 1965  2 Sheets-Sheet 2

INVENTOR.
CHESTER C. DE PEW
BY
JOHN P. CHANDLER
HIS ATTORNEY.

United States Patent Office 3,289,876
Patented Dec. 6, 1966

3,289,876
INSULATED FILLER CAP
Chester C. De Pew, Farmingdale, N.Y., assignor to Chester Corporation, Wilton, Conn.
Filed Feb. 9, 1965, Ser. No. 431,326
3 Claims. (Cl. 220—25)

This invention relates to closure cap assemblies and relates more particularly to an improved closure assembly designed primarily for aircraft fuel tanks and constructed almost completely of molded plastic insulating material and so designed as to carry the pressure loads heretofore requiring parts made from steel.

An important object of the invention is to provide an aircraft tank closure assembly having a higher safety factor where electrical discharges are concerned than do the conventional metal caps.

I described in my co-pending application Serial No. 410,069 a novel grounding plate having general application to metallic closure caps and providing means for conducting any electrical charge capable of causing a spark, produced by static electricity or lighting, harmlessly to the ground, i.e., to the metal body of the plane which is ground. This grounding plate may be applied to caps of various designs to increase the safety factor from damage due to electrical discharges. A grounding plate of this general character is preferably used in the closure cap assembly of the present invention to still further increase the safety factor.

An adapter ring of fixed design is welded to the filling opening in virtually all aircraft tanks and has a seat to receive the resilient O ring of the closure cap assembly, and slots around the inner margin of the ring through which lugs, which underlie the ring, may pass. These lugs form the only electrical connection between the upper or base plate of the cap and the adapter ring. Since the upper face of the base plate invariably has an insulating surface treatment, such as anodizing, there is a direct connection between a central rotatable stud and the interior of the tank. This provides an ineffective and inadequate conductor for any possible flow of current such as one caused by an electrical discharge, and the resulting sparks may produce disastrous results.

The grounding plate earlier mentioned goes far to eliminate this critical design fault in conventional caps but the plastic cap of the present invention provide a substantially complete elimination of the problem since there are no internal pathways to conduct its electrical charges, the central rotatable stud being encased at its lower end wholly within the plastic within which it is molded. The only one additional metallic element in metallic top surfacing for the clamping lugs underlie the inner periphery.

Figure 1:
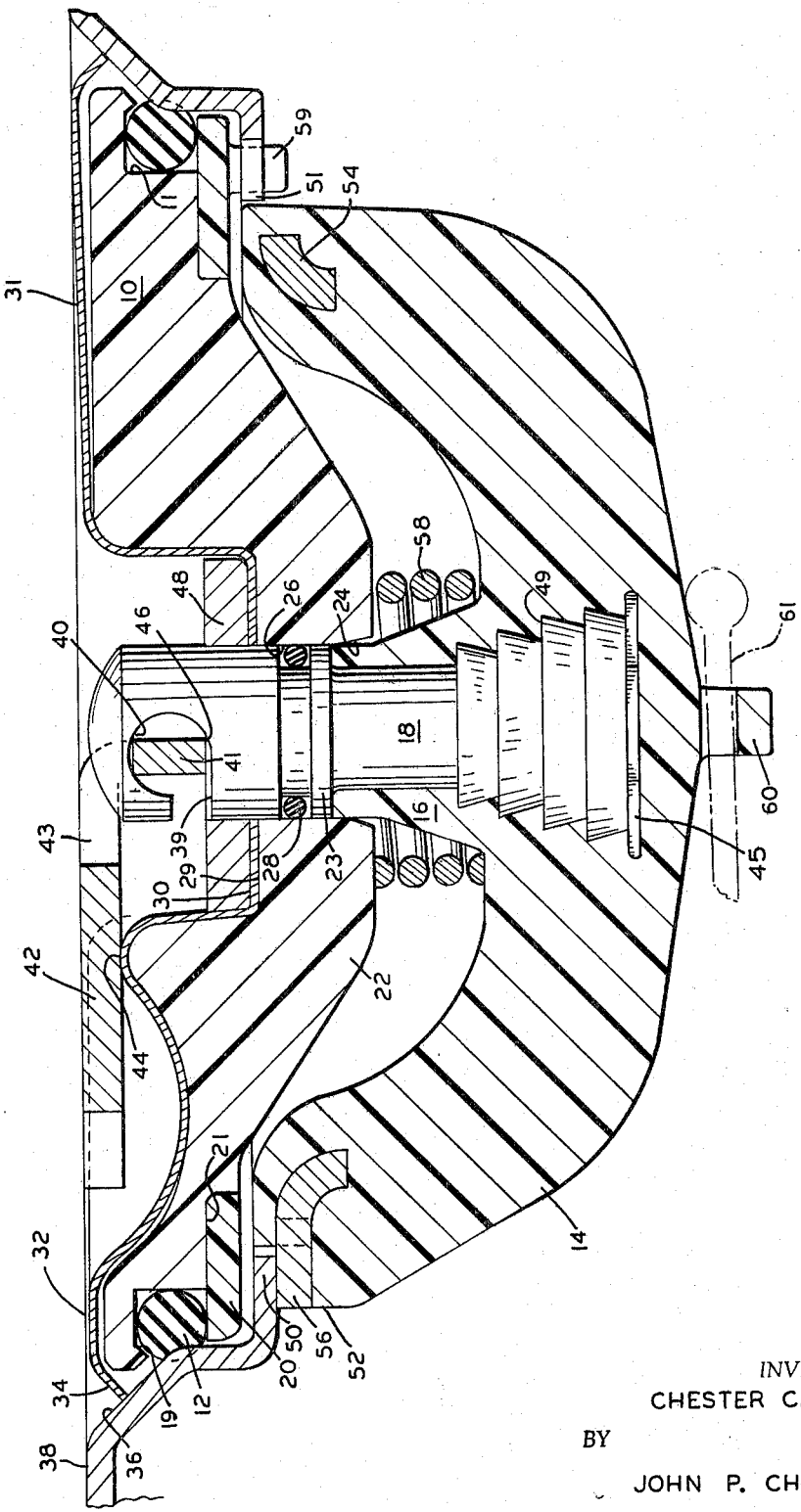
FIG. 1 is a central section taken through a filler cap assembly of the present invention.

The device of the present invention includes a filler cap having a base plate 10 provided with an annular groove 11 on its outer periphery receiving and supporting a resilient O ring 12 and a pressure plate 14 having a central hub section 16 on its upper face which receives a stud 18 of special configuration. Both the base plate and the pressure plate are molded from plastic material. The peripheral groove 11 in the base plate has an annular lip 19 on its upper edge to retain the O ring on its upper face and the lower face is retained in its groove by means of a plastic ring 20 cemented in an annular groove 21.

The lower face of the base plate has a thickened section 22 for added strength, and a central bore 24 which receives the upper section of stud 18 in freely rotative relation. Above upper section 18, there is an enlarged section 23 which has an annular groove 26 which receives a smaller O ring 28 for sealing the center of the filler cap. The upper face of the base plate has a central recessed section 29 which receives the central, downwardly recessed section 30 of a grounding plate 31 stamped from sheet metal and having a peripheral section 32 with a downwardly inclined annular rim 34 which engages an oppositely disposed diagonal section 36 of an adapter ring 38 secured by welding or otherwise to the fuel tank (not shown).

Figure 2:
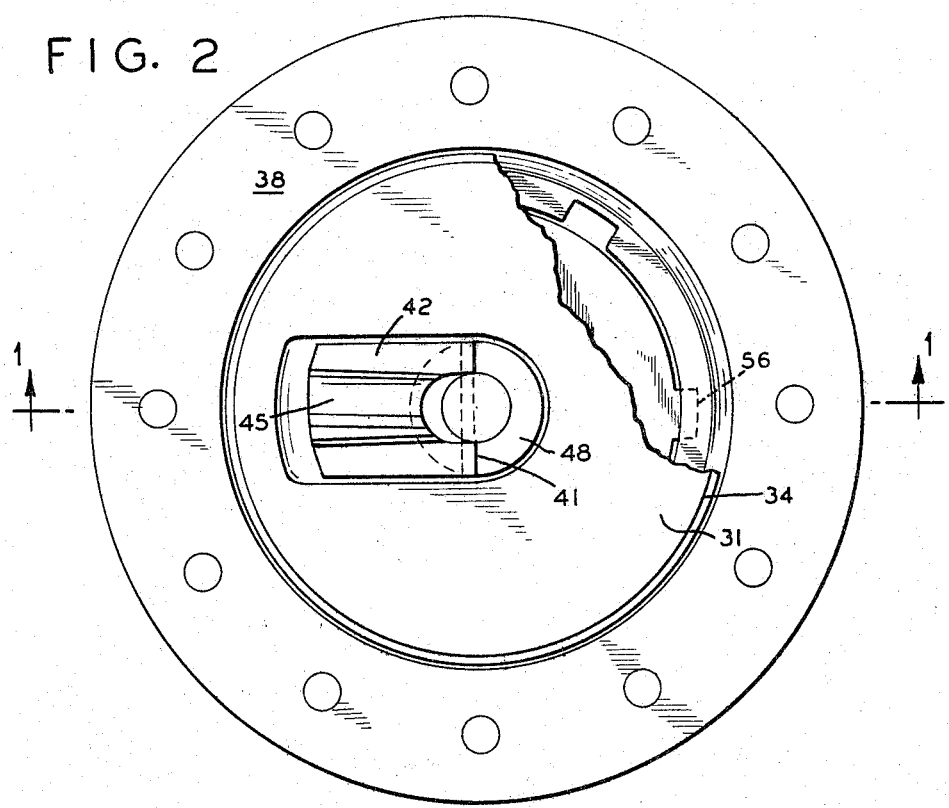
FIG. 2 is a plan view thereof and showing a modification in the pivoted handle.
Figure 3:
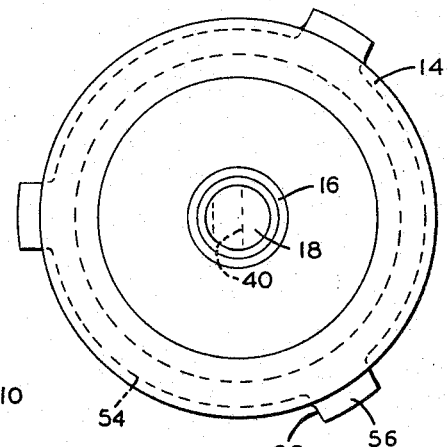
FIG. 3 is a plan view of the clamping plate with a metal plate and shaft embedded therein.
Figure 4:
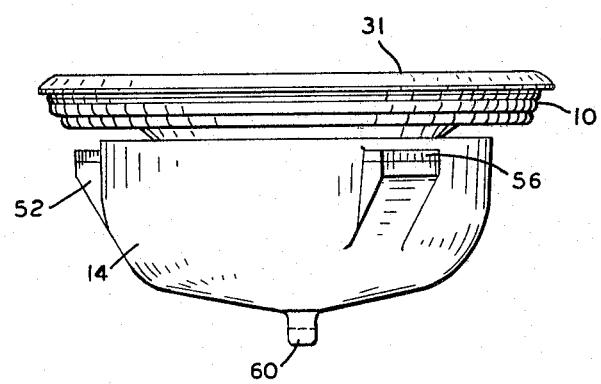
FIG. 4 is a side elevation of the filler cap assembly.

The upper end of the stud has a horizontal slot 39 extending inwardly from one side and its inner end has an upwardly curved section 40 which receives a cross piece or pivot element 41 of a sheet metal handle 42. The handle has a central opening 43 which extends into the right angular extension at its inner end which forms pivot element 41. The handle may be flat as shown in FIG. 1 or it may have an upwardly recessed section 45 for added strength as shown in FIG. 2. It also provides a finger groove. The upper faces of the base plate and of the grounding plate are downwardly recessed on one side at 44 to permit the handle to be swung down to its horizontal, locked position where it is substantially flush with the upper surface of the adapter 38 and of the perihperal section 32 of the grounding plate.

The lower right hand edge 46 of the pivot element 41 of handle 42 forms a cam to draw the pressure plate upwardly when the handle is rotated through an arc from its vertical open position to its horizontal locked position and this edge operates against a hardened wear plate 48 seated in the central recess 30 in the grounding plate and in the base plate.

In order to securely mount the stud 18 in the pressure plate in such a manner that the parts will carry the loads to which they are subjected, the stud is formed at its lower end with a plurality inverted V-shaped flanges 49 of progressively increasing diameter (Christmas tree configuration), and a lower non-circular section 45 to prevent relative rotation with the pressure plate. It will be apparent when this lower section is molded within the relatively thick central section of the pressure plate, the load resulting from the locking action is evenly distributed over the length of the stud. It will also be apparent that pull-out of the stud is a virtual impossibility despite the heavy load carried by the cone. The construction also secures the stud against rotation relative to the pressure plate.

The lower annular edge 50 of the adapter ring has a plurality (usually 3) of equally spaced slots 51 through which clamping lugs 52 pass during the initial step of effecting closing of the cap assembly. These lugs extend outwardly from the pressure plate and, for an effective wear surface, there is molded within the pressure plate a hardened metal ring 54 of lesser diameter than the outer periphery of the pressure plate but having 3 lugs 56 projecting through said outer periphery at the position of the clamping lugs, forming wear surfaces which underlie and contact the inner annular seat of the adapter ring. During this operation the pressure plate is held in maximum downward position relative to the base plate by means of a spring 58 surrounding hub section 16 of the pressure plate.

When the closure cap is placed in the adapter ring, it is necessary to line up the lugs with the slots and for this purpose stops 59 integral with retaining ring are provided. These stops also prevent the base plate from rotating when the handle is rotated to turn the pressure plate to its locked position under adapter ring. The lower end of the pressure plate has a central projection 60 with a hole through which a plastic strap 61 passes for the purpose of holding the closure cap assembly captive when out of the adapter.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim:

1. A closure cap assembly to be received in a slotted adapter ring in a fuel tank, said assembly including a base plate and a pressure plate, both formed of molded plastic material, the base plate having an annular peripheral groove and an O ring in the groove, the pressure plate having a plurality of clamping lugs extending therefrom and adapted to pass through the slots in the adapter ring, hardened wear surfaces on the upper faces of the lugs, a stud formed with annular projections embedded in the center of the pressure plate and extending up through the base plate, a handle pivoted at the upper end of the stud and having a cam to draw the pressure plate upwardly as the handle is moved downwardly to a horizontal position, and a wear plate in the central recess engaged by the cam.

2. A closure cap assembly to be received in a slotted adapter ring in a fuel tank, said assembly including a base plate having a central recess in its upper face, and a pressure plate, both formed of molded plastic material, the base plate having an annular peripheral groove, an O ring in the groove and a retaining ring below the O ring, securing the latter in place, the pressure plate having a plurality of clamping lugs extending therefrom and adapted to pass through the slots in the adapter ring, a sheet metal ring embedded within the pressure plate and having radial projections overlying the upper faces of the lugs, a stud formed with annular projections embedded in the center of the pressure plate and extending up through the base plate, a handle pivoted at the upper end of the stud and having a cam to draw the pressure plate upwardly as the handle is moved downwardly to a horizontal position, a hardened wear plate in the central recess engaged by the cam, and a grounding plate extending over the upper face of the base plate and below the wear plate, and whose annular margin contacts the adapter ring around its entire periphery to form an electrical connection with the same.

3. A closure cap assembly to be received in a slotted adapter ring in a fuel tank, said assembly including a base plate provided with sealing means for cooperation with said ring, and a pressure plate formed of molded plastic material and having a plurality of clamping lugs extending therefrom and adapted to pass through the slots in the adapter ring, a sheet metal ring embedded within the pressure plate and having radial projections overlying the upper faces of the lugs, a metal stud formed with annular projections of increasing diameter embedded in the center of the pressure plate in non-rotative relation thereto and extending up through the base plate, and handle means at the upper end of the stud to draw the pressure plate upwardly to sealing position.

References Cited by the Examiner

UNITED STATES PATENTS

| 2,735,571 | 2/1956 | Lockwood | 220—25 |
| 2,839,215 | 6/1958 | De Pew | 220—25 |
| 3,115,267 | 12/1963 | Whitman | 220—25 |

THERON E. CONDON, *Primary Examiner.*

G. T. HALL, *Assistant Examiner.*